United States Patent [19]
Rose, Jr. et al.

[11] Patent Number: 5,172,396
[45] Date of Patent: Dec. 15, 1992

[54] PUBLIC SERVICE TRUNKING SIMULCAST SYSTEM

[75] Inventors: George D. Rose, Jr.; Thomas A. Brown, both of Lynchburg, Va.

[73] Assignee: General Electric Company, Schenectady, N.Y.

[21] Appl. No.: 260,184

[22] Filed: Oct. 20, 1988

[51] Int. Cl.$^5$ ............................ H04L 7/00; H04H 3/00
[52] U.S. Cl. .................................... 375/107; 455/51.2
[58] Field of Search .......................... 375/107, 3, 11, 36, 375/40; 455/49, 51, 52, 53, 57, 115; 379/33, 63; 370/100.1, 108

[56] References Cited

U.S. PATENT DOCUMENTS

| | | | |
|---|---|---|---|
| 3,902,161 | 8/1975 | Kiowski et al. | 340/147 |
| 4,218,654 | 8/1980 | Ogawa et al. | 370/97 |
| 4,255,814 | 3/1981 | Osborn | 455/51 |
| 4,317,220 | 2/1982 | Martin | 455/72 |
| 4,411,007 | 10/1983 | Rodman et al. | 375/107 |
| 4,414,661 | 11/1983 | Karlstrom | 370/95 |
| 4,472,802 | 9/1984 | Pin et al. | 370/104 |
| 4,475,246 | 10/1984 | Batlivala et al. | 455/24 |
| 4,516,269 | 5/1985 | Krinock | 455/51 |
| 4,525,861 | 6/1985 | Freeburg | 455/33 |
| 4,570,265 | 2/1986 | Thro | 455/52 |
| 4,597,105 | 6/1985 | Freeburg | 455/33 |
| 4,696,051 | 9/1987 | Breeden | 455/33 |
| 4,696,052 | 9/1987 | Breeden | 455/51 |
| 4,718,109 | 1/1988 | Breeden et al. | 455/51 |

FOREIGN PATENT DOCUMENTS 61-107826 5/1986 Japan.

Primary Examiner—Benedict V. Safourek
Assistant Examiner—Tesfaldet Bocure
Attorney, Agent, or Firm—Nixon & Vanderhye

[57] ABSTRACT

In a multiple site radio frequency simulcasting RF transmission system, data transmitted from a control point to the RF transmitter sites exhibits random time delay skew because multi-phase modems recover clock signals from an arbitrary one of the multiple phases. The outputs of the modems are temporarily stored at the sites by memory buffers. The control point derives resynchronization signals from a source data clock, this signal containing frequency and timing information. The resynchronization signal is distributed to the various sites via additional phase-stable, delay compensated channels. Each site is provided with a clock recovery circuit that recovers the original source data clocking signal from the resynchronization signal and also extracts read-out timing information from the resynchronization signal. The recovered data clocking signal and the readout timing information are used to synchronize the readout from the FIFO memory buffers—providing approximately simultaneous (coherent) readout of the same data bits from the respective buffers of the different simulcasting transmitter sites.

17 Claims, 6 Drawing Sheets

PUBLIC SERVICE TRUNKING SIMULCAST SYSTEM

RELATED APPLICATIONS

This application is somewhat related to the following copending commonly assigned U.S. patent applications:

Application Ser. No. 07/229,814 filed Aug. 8, 1988 entitled "Dynamic Regrouping In A Trunked Radio Communication System";

Application Ser. No. 085,663 filed on Aug. 14, 1987 entitled "Radio Trunking Fault Detection System" now U.S. Pat. No. 4,903,321 issued Feb. 20, 1990;

Application Ser. No. 056,922 of Childress et al. entitled "Trunked Radio Repeater System" filed Jun. 3, 1987, now U.S. Pat. No. 4,905,302 issued Feb. 27, 1990;

Application Ser. No. 057,046 of Childress et al. entitled "Failsoft Architecture for Public Trunking System", filed Jun. 3, 1987;

Application Ser. No. 056,924 of Childress entitled "Adaptive Limiter/Detector Which Changes Time Constant Upon Detection of Dotting Pattern" filed Jun. 3, 1987 now U.S. Pat. No. 4,821,292 issued Apr. 11, 1990;

Application Ser. No. 056,923 of Childress et al. entitled "Apparatus and Method for Transmitting Digital Data Over a Radio Communications Channel" filed Jun. 3, 1987, now U.S. Pat. No. 4,905,234 issued Feb. 27, 1990;

Application Ser. No. 085,572 of Nazarenko et al. entitled "Processor-to-Processor Communications Protocol for a Public Service Trunking System" filed Aug. 14, 1987, now U.S. Pat. No. 4,835,731 issued May 30, 1989;

Application Ser. No. 085,490 of Dissosway et al. entitled "Mobile Radio Interface" filed Aug. 14, 1987 now U.S. Pat. No. 4,903,262 issued Feb. 20, 1990;

Application Ser. No. 085,491 of Cole et al. entitled "A Method for Infrequent Radio Users to Simply Obtain Emergency Assistance" filed Aug. 14, 1987 now U.S. Pat. No. 4,926,496 issued May 15, 1990; and Application Ser. No. 181,441 filed Apr. 14, 1988 entitled "Trunked Radio Repeater System" now U.S. Pat. No. 4,939,746 issued Jul. 3, 1990.

The disclosures of each of those related copending patent applications are incorporated by reference herein.

1. Field of the Invention

This invention relates to radio frequency (RF) signal transmission systems, and more particularly to "simulcasting"—the simultaneous transmission of the same information by two or more RF transmitters. Still more particularly, the invention relates to simulcasting high speed digital data transmissions in a radio repeater system including multiple remotely located radio frequency transmitters.

2. Background and Summary of the Invention

Simulcasting in a multiple-site RF transmission system is generally known. The following (by no means exhaustive) listing of prior issued patents describe various aspects of simulcasting in this type of environment:

U.S. Pat. No. 4,696,052 to Breeden
U.S. Pat. No. 4,696,051 to Breeden
U.S. Pat. No. 4,570,265 to Thro
U.S. Pat. No. 4,516,269 to Krinoc
U.S. Pat. No. 4,475,246 to Batlivala et al.
U.S. Pat. No. 4,317,220 to Martin
Japanese Patent Disclosure No. 61-107826.

As is well known, it is typically not possible for a single VHF/UHF RF repeater transmitting site to satisfactorily serve an arbitrarily large geographical coverage area due to, for example, legal and practical maximum effective radiated power limitations, and natural topographical features which block signal transmission to certain areas or prevent the transmitting antenna from being installed at sufficient elevation. Therefore, systems which must provide RF communications for an entire large geographical area (e.g., a major metropolitan area, a large county, etc.) typically include multiple RF transmission sites. FIG. 1 is a schematic diagram of a simplified multiple-site system having three radio repeater (transmitting) sites S1, S2 and S3 providing communications to geographical coverage areas A1, A2 and A3, respectively. A control point or "hub" C (e.g., a dispatch center) provides identical signals to each of sites S1-S3 via links L1-L3, respectively (these links are typically microwave links but can be landline or other type links). Each site S1-S3 transmits the signals it receives from the control point C to its respective coverage area A, so that a mobile or portable transceiver receives the same signal no matter where it happens to be in the communications system overall coverage area A' (which constitutes the "union", in an analogy to Venn diagrams, of the individual coverage areas A1, A2 and A3).

Mobile or portable transceivers within area A1 can receive the signals transmitted by site S1, transceivers within area A2 can receive the signals transmitted by site S2, and transceivers within area A3 can receive signals transmitted by site S3. Well-known mechanisms are provided in mobile and portable transceivers (and, in some cases, also at the sites) to ensure that transceivers moving out of a first site's coverage area and into a second site's area cease monitoring the signals transmitted by the first site and begin monitoring the signals transmitted by the second site—so that communication is continuously maintained without interruption so long as the transceiver stays within the overall combined system coverage area A'.

In order to prevent "dead zones" from existing at locations between the coverage areas A1-A3, it is desirable to set site transmit effective radiated output power levels (and to geographically locate the sites relative to one another) such that each coverage area slightly overlaps adjacent coverage areas. Overlap regions O12, O13 and O23 shown in FIG. 1 are examples of such overlap areas. Hence, instead of a mobile or portable transceiver receiving no signal at a point effectively "equidistant" (taking effective radiated power into account) between two transmitting sites, the transceiver receives signals from two (or more) sites at the same time. System parameters can be selected so that the transceiver is guaranteed to receive at least one of the signals at a signal strength sufficiently great to overcome noise and Raleigh fading phenomenon and thus provide a useable received signal no matter where in the overlap region the transceiver is located.

While these overlap regions eliminate dead zones, they give rise to another problem: interference between the plural different signals a transceiver may simultaneously receive while it is within an overlap region. Two signals of slightly different RF frequencies produce heterodyning effects (i.e., generation of sum and difference frequencies) in the non-linear detector of a receiver receiving both signals, and may also produce transmit "nulls" (localized dead zones created by interference patterns). Heterodyning generally must be avoided in a communications system of the type shown in FIG. 1, since it can cause a number of problems (e.g., annoying audible "beat notes" during voice communications), although the complete elimination of heterodyning may be less important in FM (frequency modulation) systems than in AM (amplitude modulation) systems due to the so-called "capture effect" (the FM limiter/detector of an FM receiver "captures" the strongest received signal and is less affected by weaker signals). Prior art solutions to the problems caused by unmatched transmit frequencies include use of different, spaced-apart transmit frequencies at adjacent sites (undesirable because it requires receivers to alternately lock onto different, separated receive frequencies based on signal strength, a process which takes too much time as will become apparent), randomly varying the transmit frequencies relative to one another to continuously shift the position of interference pattern nulls (see U.S. Pat. No. 4,570,265 to Thro), and synchronizing the transmit frequencies of different sites via a pilot tone originated by a "master" site and transmitted over a voice channel to all of the remote sites (see U.S. Pat. No. 4,317,220 to Martin).

Another serious problem in modern digital FM-based RF communications systems is caused by unequal delay times existing within the system. Referring to FIG. 1, assume a mobile transceiver is located in overlap area O12 and is receiving modulated RF signals transmitted simultaneously by sites S1 and S2. The common signal used to modulate the RF signals transmitted by both site S1 and site S2 originates at control point C and must be transmitted over link L1 to site S1 and over link L2 to site S2. Unfortunately, the delays between the control point C and the inputs to the transmitter modulators of sites S1 and S2 are typically not equal to one another. It is not practical to provide links L1-L3 with absolutely identical delay characteristics due to the difference in their physical lengths (the difference may be on the order of miles) and because even identically configured signal processing circuitry at the link ends may exhibit slightly different delay times. In addition, the site transmitter modulation circuits may introduce unequal delays, and further unequal delays exist because of the different RF signal path lengths between the transceiver sites S1 and S2.

Such time delay differences may typically be relatively short (on the order of milliseconds). However, a transceiver located in an overlap region typically alternately receives first one signal and then another signal as the signals fade or the transceiver moves in and out of "shadows" created by obstructions between the transceiver and the transmitting sites (this process of receiving first one signal, then another, and then the one signal again is caused in part by multipath fading effects). Even minor differences in delay times become extremely significant during transmission of digital data at high data transmission rates, as will be explained shortly.

By way of further simplified explanation, nearly everyone while watching television has occasionally come across the same program simulcasted over two different television channels with one version of the program being slightly delayed (e.g., up to several seconds) with respect to the other. It is possible to watch a few seconds of the program on one channel, and quickly change the channel selector to watch the same few seconds again on the other channel. Similarly, a few seconds of the program will actually be "missed" by the viewer if he watches the version of the program which "lags" behind the other version and then quickly switches the program selector to the other channel (which is several second "ahead" of the lagging channel).

Now suppose the television receiver regularly, rapidly alternated between the two channels at more or less random times and could not be prevented from doing so (as is the case with a radio transceiver located in an overlap region between two sites of a multisite RF communications system). Needless to say, even voice transmissions would become severely distorted if differential delays of a few milliseconds—let alone seconds—existed in the system. High speed digital data becomes garbled if it is simulcasted in a system exhibiting more than a few microseconds (millionths of a second) of delay between the time one site transmits a data bit and the time an adjacent site transmits the same data bit.

For example, the General Electric Public Service Trunking system transmits digital data over the RF control and working channels at a nominal data transmission rate of 9600 bps—so that each bit occupies a 104 microsecond time period. Now suppose a transceiver located within overlap region O12 receives a data stream modulated RF signal transmitted by site S1 at a time $T_0$ and also receives the same data stream transmitted by site S2 but delayed by a time period Delta $T=190$ microseconds for example (as shown in FIG. 2A). The transceiver might be receiving bit B0 transmitted by site S1 and then suddenly find itself locked onto the signal transmitted by site S2 (e.g., due for example to fading of the S1 signal) and receiving bit B2. Bit B1 would be entirely lost (wreaking havoc on the transceiver's bit synchronization and bit recovery and error checking circuitry) due to a differential delay of less than 200 microseconds.

In fact, as is well known to those skilled in the art, for acceptable digital simulcast operation the system time delays must typically be adjusted so that the data signals from the several simulcast transmitters S1 and S2 arrive at any arbitrary location in the overlap region within less than ½ bit period of one another (52 microseconds for 9600 baud operation, see FIG. 2B). So long as this ½ bit time maximum bit skew (including jitter) is maintained, a receiver receiving two versions of the data signal will be able to switch between one and the other without losing bit synchronization or the ability to accurately decode the data stream.

Delays due to the limited speed at which electromagnetic waves propagate must be taken into account in systems simulcasting data at high data transmission rates (an RF signal travels "only" about 300 meters in one microsecond). It is possible (and usually necessary) to adjust the relative effective radiated power levels of the site transmitters so that the distances across the overlap regions are kept less than a desired maximum distance—and thus, the difference in the RF propagation delay times across an overlap region due to the different RF path lengths between the sites and a receiver within the overlap region is minimized. Even with this optimization, it has been found that a maximum system differential delay stability of plus or minus 5 microseconds must be observed for guaranteeing that a transceiver at any arbitrary location within a typical overlap region O12 will receive those two edges within 52 microseconds of one another (due to the additional differential delay caused by the different RF path lengths).

Fortunately, it is typically possible to minimize time delay differences to on the order of less than a microsecond through various known techniques. For example, it is well known in the art to introduce adjustable delay networks (and phase equalization networks) in line with some or all of links L1-L3 to compensate for inherent different link delay times (see U.S. Pat. No. 4,516,269 to Krinock, and U.S. Pat. Nos. 4,696,051 and 4,696,052 to Breeden). Typical conventional microwave link channels exhibit amplitude, phase and delay characteristics that are extremely stable over long periods of time (e.g., many months), so that such additional delays, once adjusted, guarantee that a common signal inputted to all of links L1-L3 at the same time will arrive at the other ends of the links at almost exactly the same time. The same or additional delays can be used to compensate for different, constant delay times introduced by signal processing equipment at the sites S1-S3 to provide simultaneous coherent transmission of the signals by the different sites.

Present day available conventional 9600 baud telephone line type modems use a multi-level, multi-phase protocol (e.g., CCITT v. 29) to "squeeze" the 9600 baud signal into the limited bandwidth of a telephone line. Data grade telephone lines typically exhibit a bandwidth of about 300 Hz to 3000 Hz—while an NRZ 9600 bps signal requires approximately 10 KHz of bandwidth to be transmitted with no loss of information content. These conventional 9600 baud modems typically employ a 4-phase, 4-amplitude protocol (a form of data bandwidth compression permitting 4 NRZ bits to be encoded into a single 2400 baud bit time) which permits the 9600 baud data signal to be transmitted over a 3 kHz voice channel.

Readily available 9600 baud modems of this type typically employ a phase locked loop clock recovery system which unfortunately can lock in on any one of the four successive phases present in the signal. The modems thus exhibit an absolute delay ambiguity of up to 4-bit times. This means that when a source modem is driving several receive modems, the received data from one receive modem may be skewed with respect to the received data provided by another receive modem by up to plus or minus 4 data bits (over 400 microseconds at 9600 baud). Turning the source modem off and on again results in a different skewing arrangement. It is apparent that this performance is unacceptable in a simulcasting system, since the data could only be guaranteed to arrive at the various transmitting sites within plus or minus 400 microseconds or so while a plus or minus 5 microsecond time window is required. Because the skewing arrangement is not constant over long time periods (and, in fact, may and typically does change every time the modems are turned off and back on again), it is not practical to compensate for the different delays introduced by the modems using the technique of adding compensating delay times—since this would require the delay circuitry to be readjusted each time data from the source modem was interrupted and each time any of the received modem clock recovery systems locked onto a different phase of the 4-phase signal. 9600 baud modems do presently exist which do not exhibit the skewing problem discussed above, but such modems are very expensive compared to other 9600 baud modems. It would be highly desirable to provide a simulcast system which could use readily available 9600 baud modems exhibiting the delay ambiguity discussed above and, through the use of additional, relatively inexpensive components, still guarantee that all remote sites receive the same data bits within plus or minus 5 microseconds (or less) of one another.

The present invention solves this problem by providing additional frequency and timing information to each site over one or more additional channels. This additional frequency/timing information is encoded in a signal having a frequency lower than the data transmission rate and a bandwidth low enough to be carried by conventional delay compensated telephone type links (e.g., equalized program channels in the preferred embodiment). The additional frequency/timing information is used to resynchronize the data provided by the site receive modems.

In somewhat more detail, data may be transmitted from the control point to the sites using conventional multi-level, multi-phase protocol-type 9600 baud modems. The receive modems at the various simulcasting sites thus provide output data streams which may be skewed by an essentially random time delay less than a maximum delay (e.g., 4 bit times in the preferred embodiment). The outputs of the received modems are temporarily stored at the sites by respective first-in-first-out (FIFO) memory buffers. The control point derives one or more resynchronization signals from the source 9600 baud data clock, this signal containing frequency and timing information. The resynchronization signal is distributed to the various sites via additional phase-stable, delay compensated channels. Each site is provided with a clock recovery circuit that recovers the original 9600 Hz source data clocking signal from the resynchronization signal, and also extracts read-out timing information from the resynch signal. The recovered data clocking signal and the read-out timing information are used to synchronize the readout from the FIFO memory buffers—providing coherent (within plus or minus 5 microseconds) readout of the same data bit from the respective buffers of the different simulcasting transmitter sites.

By separating the frequency/timing information from the data, the present invention permits the (high bandwidth) data to be transmitted over a link that exhibits some delay time ambiguity. The frequency/timing information must be transmitted over links that are delay compensated to within very close tolerances, but it is much easier and convenient (and also much less expensive) to provide such links for the relatively narrow bandwidth frequency/timing information. The resulting system provided by the present invention provides excellent data coherence to within very close tolerances at a much lower cost than would be required to transmit the data and the critical timing information together in the same signal stream using current technology.

The following is a list of some of the advantages and features provided by the present invention:

Any delay ambiguities or time variations inherent in multi-level PSK data modems are eliminated;

One synchronization channel is required for all of the data channels;

By using two synchronization channels, data can be further resynchronized to some additional system function while not interrupting the data clock; and No special modification to the data modems or to the mux channels are required.

BRIEF DESCRIPTION OF THE DRAWINGS

These and other features and advantages of the present invention will be better and more completely understood by referring to the following detailed description of the presently preferred exemplary embodiments in conjunction with the accompanying drawings, of which.

DETAILED DESCRIPTION OF THE PRESENT PREFERRED EXEMPLARY EMBODIMENTS

Figure 1:
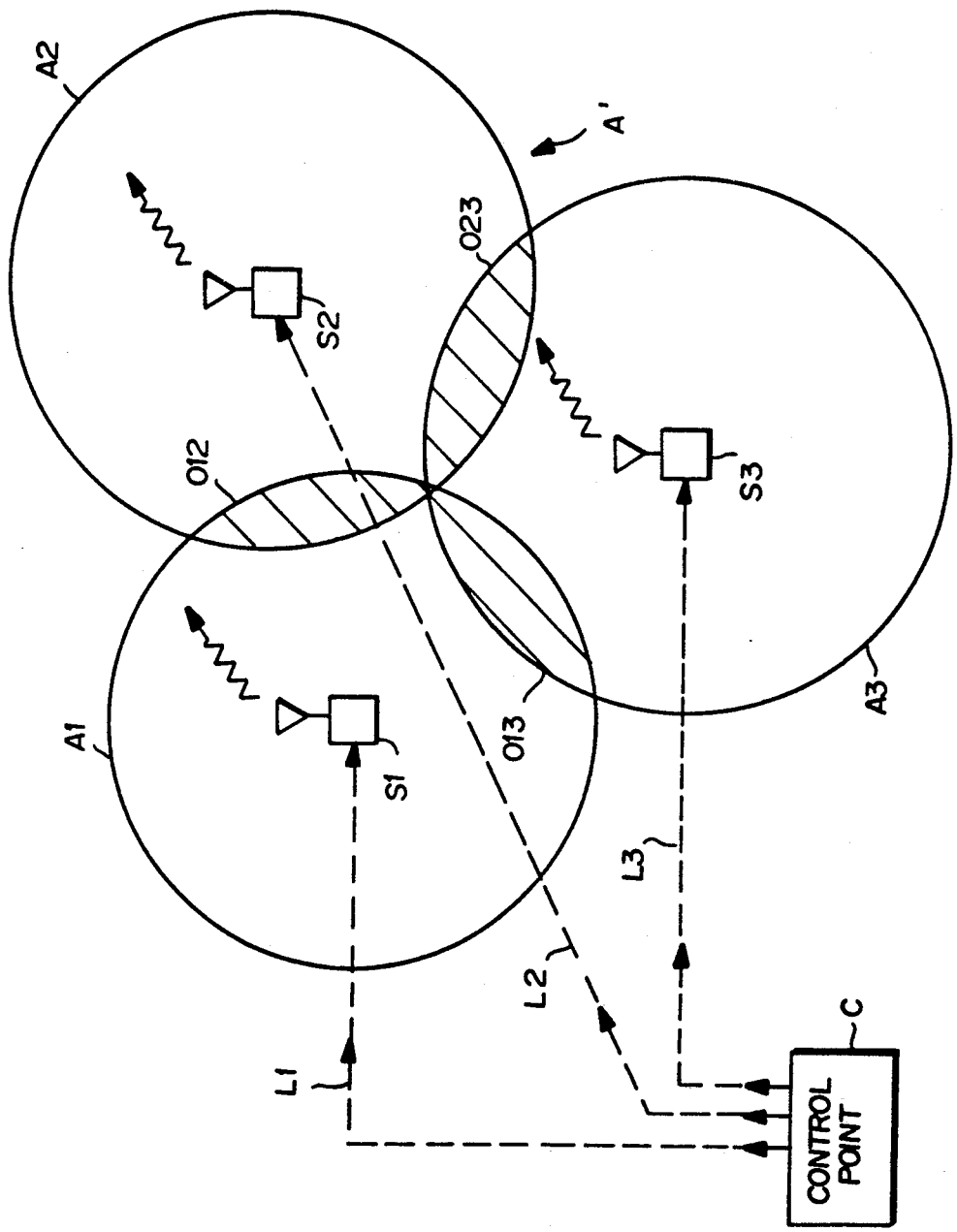
FIG. 1 is a schematic diagram of a prior art exemplary simplified multi-site RF communication simulcasting system.
Figure 2A:
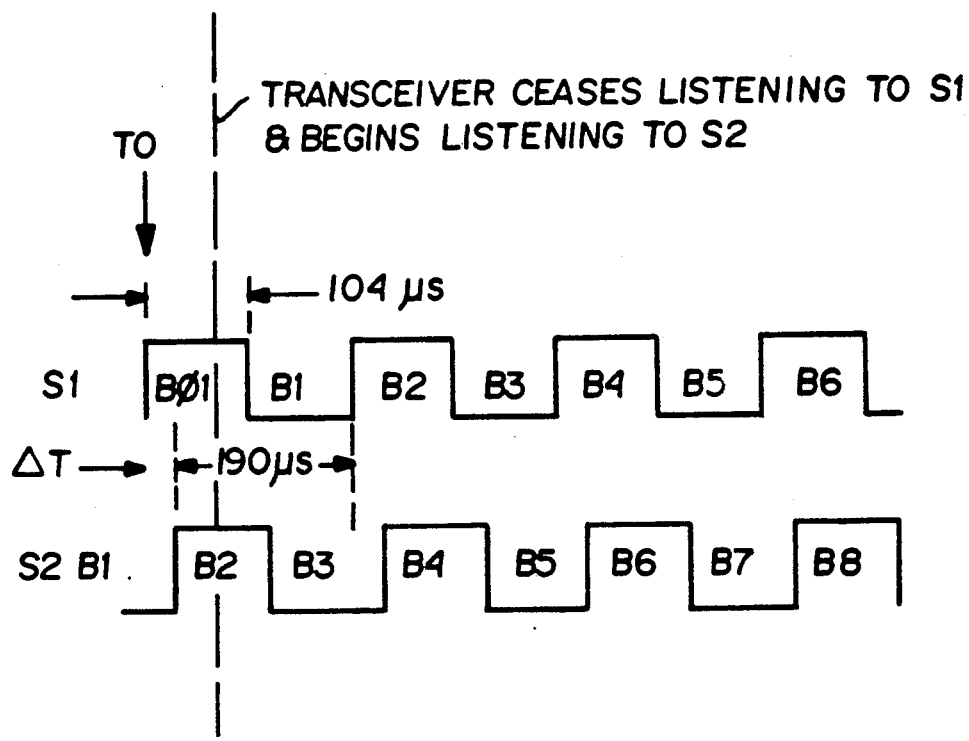
FIGS. 2A and 2B are graphical illustrations of exemplary bit-stream delays which may be exhibited by the system shown in FIG. 1.
Figure 2B:
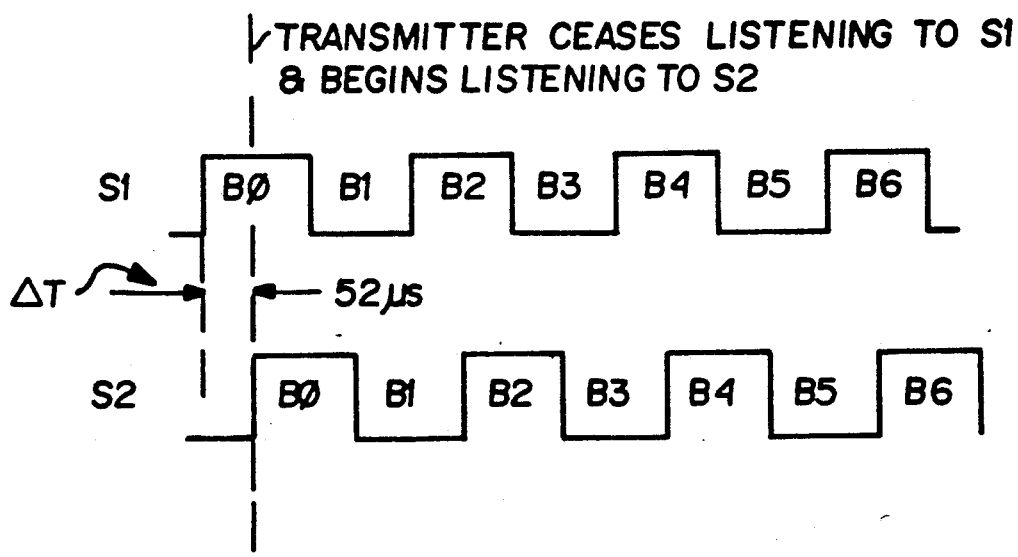
Figure 3:
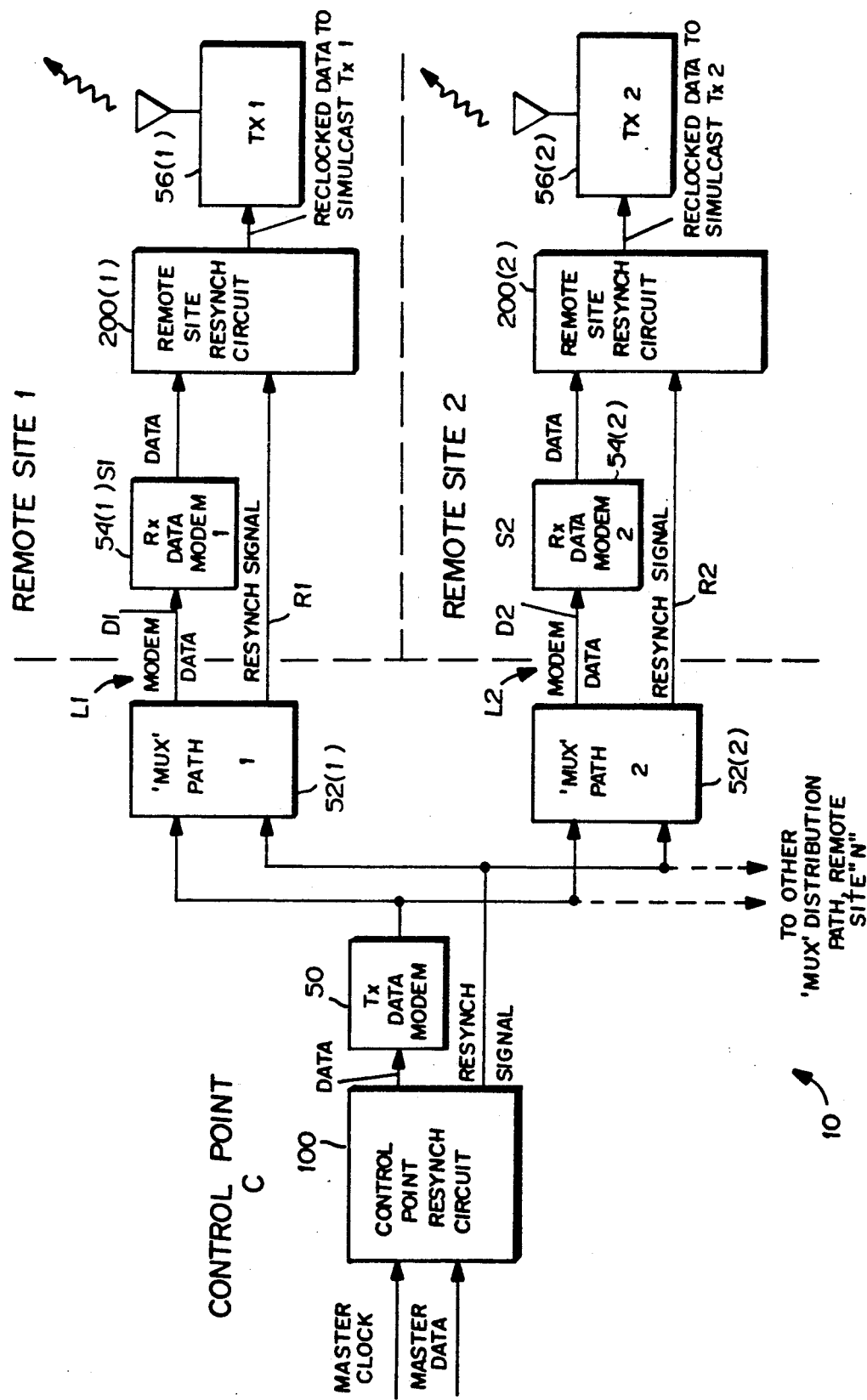
FIG. 3 is a schematic block diagram of a coherent digital data transmission/simulcasting system in accordance with the presently preferred exemplary embodiments of the present invention.

FIG. 3 is an overall block diagram of the presently preferred exemplary embodiment of a simulcasting multi-site digital RF communications system 10 in accordance with the presently preferred exemplary embodiment of the present invention. System 10 has the same overall architecture as is shown in FIG. 1—that is, it includes a control site C and plural remote sites S (only two remote sites S1 and S2 are shown, although it will be understood that any arbitrary number N of remote sites may be provided). Control site C includes a transmit data modem 50 (e.g., a conventional 9600 baud type multi-level, multi-phase CCITT v. 29 telephone line type modem). The resulting self-clocking output data stream provided by modem 50 is applied in the preferred embodiment to a conventional type T-1 time-division-multiplexed (TDM) digital telephone network (shown schematically in FIG. 3 as multiplexers 52(1), 52(2)) and may be distributed to remote sites S1, S2 via data grade channels D1, D2 of a conventional microwave link communications system.

In the preferred embodiment, at least two discrete channels are provided by multiplexing system 52 between control point C and each of remote sites S. Specifically, the 9600 baud DATA OUTPUT of modem 50 is transmitted over a dedicated delay compensated data channel D1 to remote site S1, and the output of modem 50 is also transmitted over remote site S2 over another dedicated delay compensated data channel D2. In addition, at least one delay compensated, phase equalized 7.5 KHz program channel (shown schematically as R1 in FIG. 3) connects the control point C to remote site S1, and at least one more delay compensated, phase equalized 7.5 kHz program channel (shown schematically as R2) connects the control point to site S2 in the preferred embodiment. Channels R1, R2 provide frequency and timing information to the remote sites, as will be explained shortly.

Site S1 includes a conventional 9600 baud data receive modem 54(1) connected to the data channel D1 modem 54(1) decodes the multi-phase, multi-level 9600 baud data stream sent to it by control point transmit modem 50 via link L1. Receive data modem 54(1) provides a decoded 9600 baud data stream at its data output and also provides recovered 9600 Hz clocking information derived from and corresponding to the received data stream. Similarly, remote site S2 includes a receive data modem 54(2) which receives the multi-level, multi-phase data stream transmitted to it over link L2 data channel D2 from control point data modem 50 and provides at its output a 9600 baud decoded data stream and a corresponding regenerated 9600 Hz clock signal.

The data streams provided at the outputs of site receive modems 54(1), 54(2) correspond exactly (assuming no uncorrected transmission errors occur) with the data stream applied to the input of control point transmit modem 50. However, as discussed above, the data output streams provided by site S1 data modem 54(1) and site S2 data modem 54(2) will not be coherent in time (even with additional delay circuitry incorporated into data channels D1, D2 carefully adjusted to compensate differences in delay times over links L1, L2) because of the time ambiguities generated by conventional data modems 50, 54. Conventional modems 50, 52 exhibit an absolute, unpredictable delay ambiguity of up to 4 bits, so that the data output stream of receive data modem 54(1) may be skewed in time by as much as plus or minus 400 microseconds with respect to the data output provided by site S2 received data modem 54(2). Even perfect compensation of the differential delay times between the output of transmit data modem 50 and the input of receive data modem 54(1) with respect to the output of the transmit data modem and the input of site S2 receive data modem 54(2) will not eliminate this delay ambiguity.

In the preferred embodiment control point C further includes a control point resynchronization circuit 100 to which master clock and master data input signals are provided. Control point resynchronization circuit 100 resynchronizes the data signal in accordance with an internally generated resynchronization signal derived from the master clock signal, and provides the resynchronized data signal to the input of transmit data modem 50. As will become apparent, resynchronization of the data at the control point is desirable to assure that the start of a data sequence is coincident with the occurrence of a transition of an additional resynchronization signal also provided by control point resynchronization circuit 100 (failure to do this could result in occasional improper resynchronization operation). Control point resynchronization circuit 100 also produces at least one (and in one preferred embodiment as will be explained later, two) resynchronization signals as an output. This resynchronization signal, which contains timing and frequency information, is transmitted over links L1, L2 (actually channels R1, R2) to remote site resynchronization circuits 200(1), 200(2) located at sites S1, S2, respectively. Remote site resynchronization circuits 200 regenerate a 9600 Hz clocking/timing signal in response to the resynchronization signal they receive from the control point C. This clocking/timing signal is used to resynchronize the data provided by receive modems 52 to provide time-coherent (within plus or minus 5 microseconds or less) 9600 baud data streams at each site S1, S2 for simulcast transmission by conventional RF transmitters TX1, TX2.

As is well known, the signal stream provided by transmit data modem 50 is self clocking in that clocking (timing) as well as data signals can be derived from it. In the preferred embodiment, each remote site resynchronization circuit 200 loads the data bit stream received by receive data modem 54 into a FIFO memory buffer under control of the clocking signal provided by the receive data modem 54. The remote site resynchronization circuit 200 then reads the loaded data out of the FIFO memory buffer in response to the additional clocking/timing signal it recovers from the resynchronization signal it receives over channel R. In the preferred embodiment, the clock signals recovered from the resynchronization signal are coincident in time with very little jitter—and therefore cause the same bits to be read from the FIFO memory buffers of all remote site resynchronization circuits 200 at nearly exactly the same time (within a few microseconds).

As will be explained shortly, the resynchronization signals provided by control point C to each remote site S in the preferred embodiment include a resynchronization signal (which is derived from the control point master clocking signal in the preferred embodiment and must be a sub-multiple of the master clocking signal frequency) and have a period that is greater than the maximum expected data skew. The control point may also provide a separate frequency reference tone (in one embodiment) providing frequency information from which the remote site resynchronization circuits regenerate a 9600 Hz clocking signal used to clock the FIFO memory buffer read-out. The reference tone must be continuous to provide the required clock signal stability of the remote site resynchronization circuit. Because of other possible independent system timing or synchronization criteria in the preferred embodiment, a separate resynchronization signal may be used to carry timing information (and the reference tone used to carry only frequency information)—as will be explained shortly in greater detail. Where such independent timing criteria does not exist, the same resynchronization signal may carry both the frequency and timing information.

Figure 4:
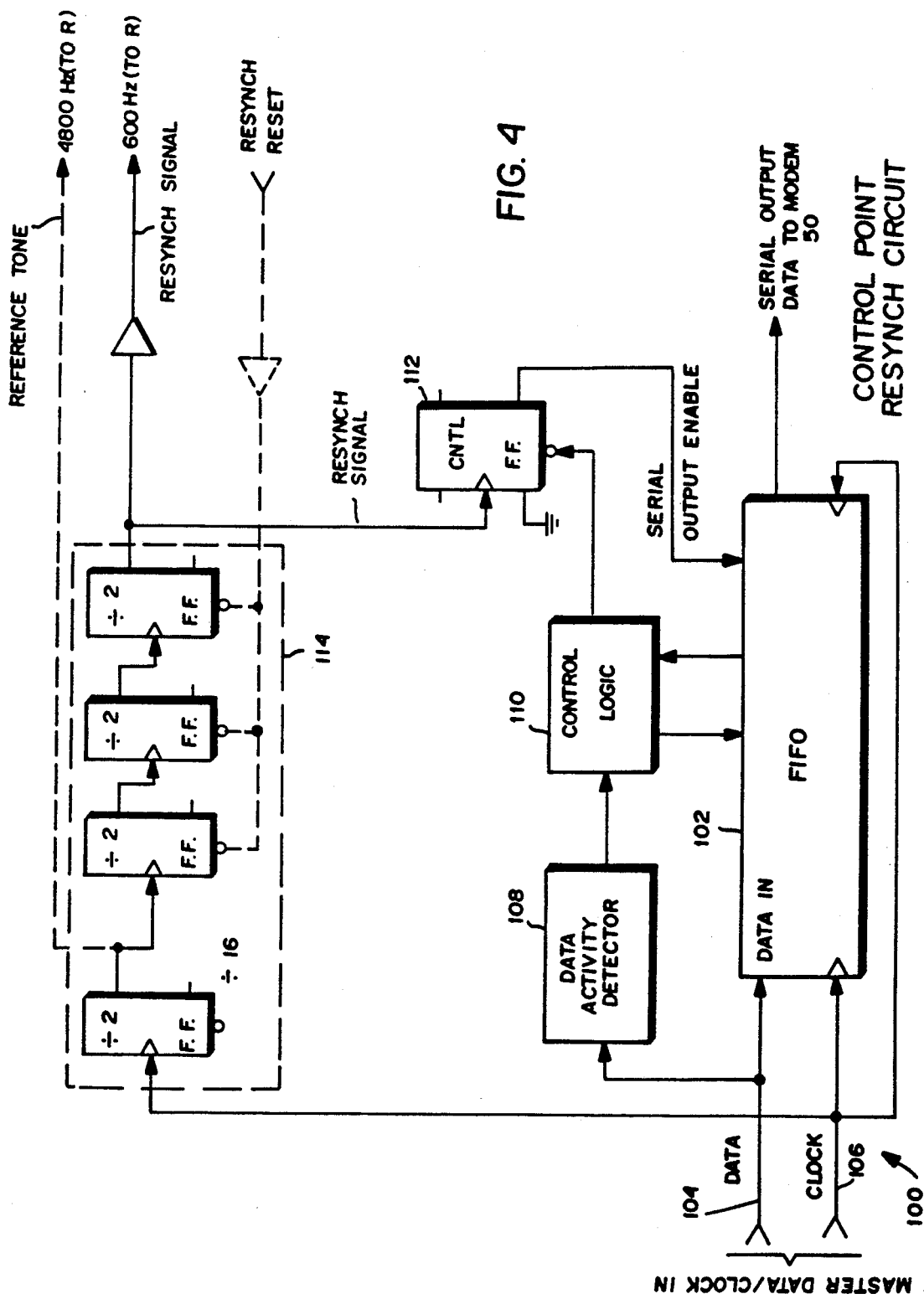
FIG. 4 is a more detailed schematic block diagram of the control point resynchronization circuit shown in FIG. 3.

FIG. 4 is a somewhat more detailed schematic diagram of the control point resynchronization circuit 100 shown in FIG. 3. Referring to FIGURE 4, data to be coherently distributed to remote sites S1, S2 is applied to the data input of a first-in-first-out (FIFO) memory buffer 102 via data line 104. A 9600 Hz master clock signal is applied to the FIFO memory buffer 102 "clock in" input via clock line 106. FIFO memory buffer 102 stores incoming bits of data applied to its data input in response to transitions of the 9600 Hz clock signal on line 106.

A data activity detector 108 senses when incoming data is present on line 104. Coincident with the first data transition, data activity detector 108 generates a control signal which it applies to the input of control logic 110. Control logic 110 normally applies a control signal to a control flip-flop 112 which causes the flip flop to remain in a predetermined state regardless of transitions on its clock input. The output of data activity detector 108, along with appropriate control signals from FIFO memory buffer 102, cause control logic 110 to release this control signal so that flip-flop 112 may change state at the next clocked input transition. Control flip-flop 112 changes state with the next active edge of a resynchronization timing signal applied to its clock input, thus generating a serial output enable control signal. This signal output enable control signal provided by flip-flop 112 enables the memory buffer to provide serial output data to transmit data modem 50 at times specified by the 9600 Hz master clock signal.

In the preferred embodiment, the resynchronization signal is generated by dividing the 9600 baud master clock synchronization signal by an integer—a factor of 16 in the embodiment shown (to provide a 600 Hz timing signal in step with the master clocking signal—600 Hz being chosen in the preferred embodiment because the period of 600 Hz is longer than the maximum expected skew of the data to be resynchronized). In the preferred embodiment, the divide-by-16 function is provided by a counter 114. Because the control flip-flop 112 is clocked by the 600 Hz resynchronization signal, the first data bit of a transmitted 8-bit 9600 baud data byte sent to transmit modem 50 always occurs coincident with a 600 Hz synchronization signal transition.

Figure 5:
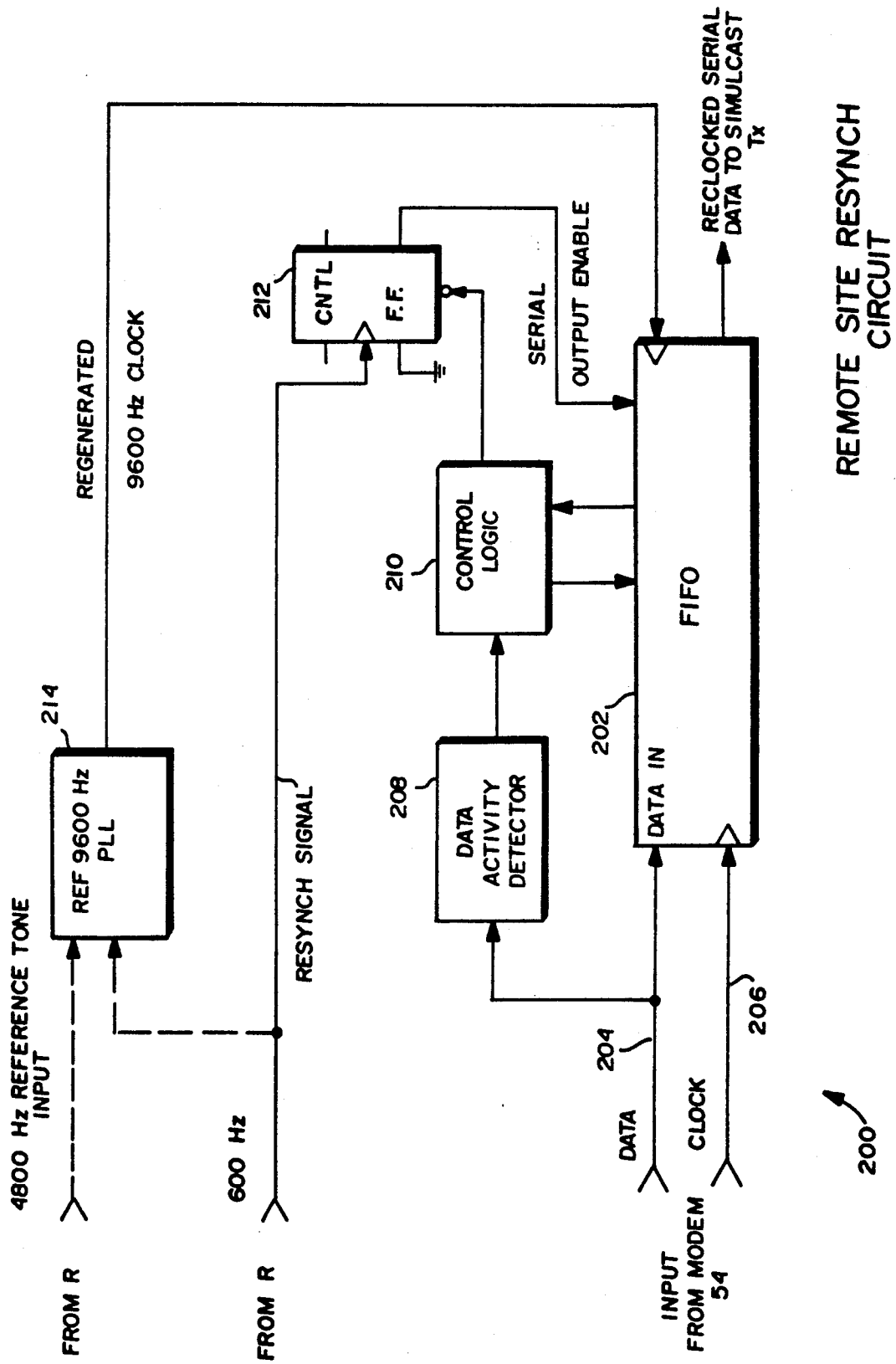
FIG. 5 is a more detailed schematic block diagram of the remote site resynchronization circuits shown in FIG. 3.

Referring now to FIG. 5 (a detailed schematic block diagram of the remote site resynchronization circuit 200), the (non-coherent) data and clock signal provided by receive data modem 54 is applied to the data and clock inputs, respectively, of a FIFO memory buffer 202 via data line 204 and clock line 206. Just as in the control point resynchronization circuit 100, the FIFO memory buffer 202 stores the incoming data bits occurring on line 204 in response to transitions of the clock signals present on line 206. Coincident with transitions of data on data line 204, a data activity detector 208 operates to provide an output to control logic 210. This data activity detector 208 output, along with the appropriate control signals from FIFO memory buffer 202, cause control logic 210 to release a reset signal connected to an asynchronous input of flip-flop 212—thereby permitting the flip-flop to change state in response to transitions appearing on its clock signal input. Meanwhile, the 600 Hz resynchronization signal has been communicated from the output of control point divide-by-16 divider circuit 114 via program channel R to the clock input of flip-flop 212. At the occurrence of the next active edge of the resynchronization signal, flip-flop 212 changes logic state and thereby provides a serial output enable signal which enables the output of FIFO memory buffer 202. The data stored in FIFO memory buffer 202 is then clocked out under control of a regenerated 9600 Hz clock signal provided by a phase-locked loop based clock recovery circuit 214. Clock recovery circuit 214 also receives the 600 Hz resynchronization signal from channel R, and in one embodiment regenerates the 9600 Hz clocking signal from this resynchronization signal using a conventional phase-locked loop circuit locked to the 600 Hz synchronization signal acting as a multiply-by-16 frequency multiplier.

In the preferred embodiment, the 9600 Hz clock signal regenerated by each remote site S1, S2 and used to control readout from FIFO memory buffers 202 is thus locked to the control point 9600 Hz master clock signal present on control point line 106 (via divider 114, program channels R and clock recovery circuits 214). Program channels R are delay compensated to within 1 microsecond or so—ensuring that clock transitions provided by the clock recovery circuits of the various remote sites occur coherently in time. The time coherence of the 600 Hz resynchronization signal transitions in turn ensures that all remote sites read out the same bit stored in their respective FIFO memory buffers 202 at the same time (within plus or minus 5 microseconds maximum, and in the preferred embodiment, within plus or minus 1 microsecond) for simulcasting—even though those bits may have arrived at the sites via modems 54 displaced by 400 microseconds or so from one another.

The use of the resychronization circuits 100, 200 of the present invention somewhat relaxes the requirement for delay compensation of data channels D between control point C and remote sites S1, S2—since slight differences in delay are corrected by the resynchronization process. This may or may not be advantageous depending upon the specific simulcasting system involved—since the same channels D are typically also used for voice signal communications and simulcasting of voice signals imposes very stringent delay compensation as well as phase and amplitude equalization requirements. Even if channels D do not need to be critically delay compensated for carrying simulcasted voice signals, the channels preferably are nevertheless amplitude, group and delay compensated so as to ensure that no remote site FIFO memory buffer 202 ever underflows or overflows during a digital transmission.

As explained above, the control point resynchronization circuit 100 ensures that the first data bit of a transmitted 9600 baud data occurs coincident with a 600 Hz synchronization signal transition. The maximum time skew exhibited by modems 50, 54 in the preferred embodiment is 8 bits but sixteen 9600-baud equivalent bits can occur during the interval of the 600 Hz synch signal frame (this frame is 1.666 milliseconds long in the preferred embodiment). Thus, so long as a given data bit arrives at all sites within the period of one 600 Hz synchronization frame, the resynchronized data from the FIFO memory buffers 202 at each site will be coherent. This is the minimum delay compensation criterion for data channels D in the preferred embodiment. So long as this delay compensation criterion is observed, the remote site memory buffers 202 will not overflow or underflow and the bit to be clocked out of the buffer will always be stored in the buffer prior to the time it is to be clocked out.

It will be understood that FIFO memory buffers 102, 202 need only store a maximum of 8 bits in the preferred embodiment, and generally store no more than 4 bits at any time.

Figure 6:
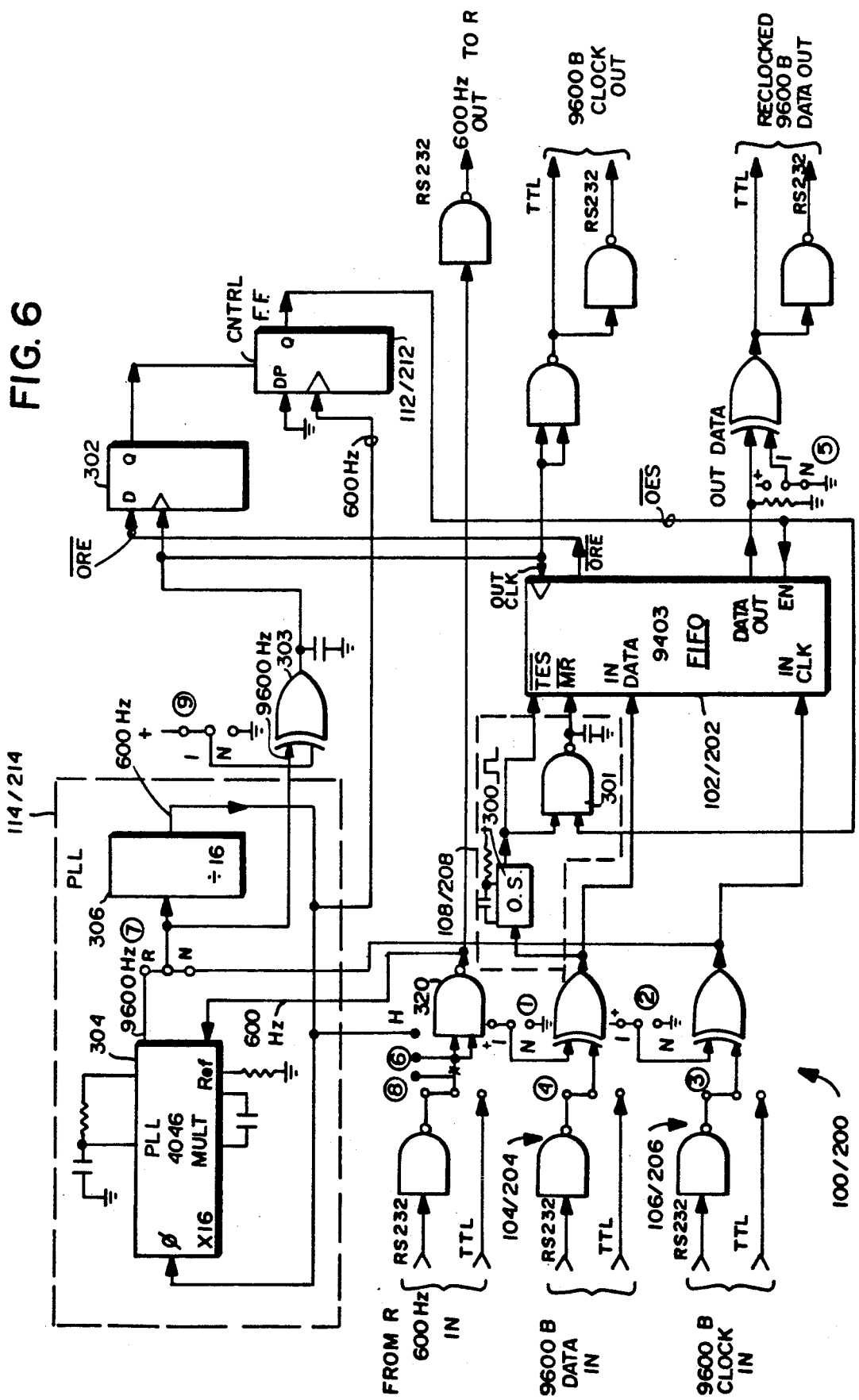
FIG. 6 is a detailed schematic diagram of an exemplary universal resynchronization circuit which may be used as both the control point resynchronization circuit and as the remote site synchronization shown in FIG. 3.

A detailed schematic diagram of an exemplary universal resynchronization circuit 100/200 in accordance with the presently preferred exemplary embodiment of the present invention is shown in FIG. 6. In the preferred embodiment, replications of the same identical circuit shown in FIG. 6 are used for the control point resynchronization circuit 100 and for the remote site resynchronization circuits 200 in order to reduce inventory and manufacturing overhead.

Referring now to FIG. 6, various gates are provided on data input line 104/204 and clock input line 106/206 to provide for inverted/non-inverted operation and for selecting between TTL and RS232 input levels. After passing through these gates, the data in signal present on line 104/204 is applied to the "in data" terminal of a conventional off-the-shelf FIFO memory buffer 102/202 integrated circuit device type 9403—and similarly, the 9600 baud input clocking signal present on line 106/206 is applied to the IN CLK input terminal of the FIFO chip. In the preferred embodiment, data activity detector 208 comprises a conventional retriggerable "one-shot" (monostable multivibrator) integrated circuit 300 which changes the state of the IES input of FIFO chip 9403 as long as 9600 baud data is present on the "data in" line 104/204. The output of one-shot 300 is also applied to the input of a two-input NAND gate 301 (part of control logic 110/210) the other input of which is connected to the Q output of D-type control flip-flop 112/212. The PRESET asynchronous input of control flip-flop 112/212 is connected to the Q output of a further D flip-flop 302 (which may be considered another part of control logic 110/210). The D input of flip-flop 302 is connected to the "ORE" (output read enable) output of FIFO 102/202, and the clock input of that flip-flop 302 is connected to the output of a XOR gate 303. XOR gate 303 provides (inverted or uninverted form as selected by a jumper 9) the 9600 Hz clocking signal provided by clock recovery circuit 114/214.

Control flip-flop 112/212 in the preferred embodiment is a type 74LS74 device having an active low preset input (that is, when the preset input goes to logic level 0, the flip flop asynchronously clears and the Q output drops to logic level 0 and remains locked in this state until the preset input returns to logic level 1—regardless of transitions occurring on the flip flop clock input). The ORE output provided by FIFO 102/202 as soon as data is available at the FIFO output in combination with transitions of the 9600 Hz clock signal available at the output of gate 303 control the state of flip-flop 302 (introducing a one-clock-time delay in the preferred embodiment)—which in turn inhibits or enables control flip-flop 112/212 to respond to transitions of the 600 Hz resynchronization signal. Control flip-flop 112/212 sychronizes the ORE FIFO output with the active edge of the 600 Hz synchronization signal. Control flip-flop 112/212 provides the synchronized control signals an active low logic level 0 "output enable signal" (OES) at its Q output in response to the active edge of the 600 Hz resynchronization signal—this signal in turn enabling the FIFO 102/202 data output onto the "out data" line by effectively gating the 9600 Hz clock signal. The FIFO is clocked by the gated 9600 Hz clocking signal applied by gate 303 to the FIFO "out clock" input to deliver coherent reclocked data at 9600 baud to the "out data" line in synchronism with the transitions of the 9600 Hz clocking signal.

In the preferred embodiment, an identical circuit shown in FIG. 6 is used for both the divide by 16 divider/counter 114 shown in FIG. 4 and the PLL clock regeneration circuit 214 shown in FIG. 5. This circuit 114/214 includes a standard off-the-shelf phase-locked loop integrated circuit type 4046 (reference 304 shown in FIG. 6). This PLL chip 304 includes an internal multiply-by-16 multiplier in the embodiment shown. The loop filter and other parameters of the PLL 304 should be designed in the preferred embodiment to minimize phase jitter while still providing acceptable loop acquisition time (in one embodiment, the loop filter RC network was provided with a 4.7 microfarad capacitor to provide phase jitter of less than one microsecond, while an RC network consisting of a 4.7 KOhm resistor and 0.22 microfarad capacitor provided output jitter of about 2 microseconds relative to 600 Hz). The reference input of PLL 304 is connected to the 600 Hz resynchronization signal obtained from program channel R in the preferred embodiment (for remote site resynch circuits) and provides a 9600 Hz output clocking signal locked to that 600 Hz signal. This 9600 Hz clocking signal is applied to the input of a type 7493 divide by 16 counter 306 for remote site resynch circuits (or at the control point, jumper 7 is changed to feed the 9600 Hz master clocking signal directly to the input of the divider/- counter). The output of counter 306 is, in turn, provided to the phase detector input of PLL chip 304, and is also provided to the clock input of control flip-flop 112/212 as mentioned previously. A further jumper 6 is used to route the 600 Hz resynchronization signal to the input of a gate 320 (for remote site resynch circuits) or to route the 600 Hz output signal of divider 306 to the gate input (for control point resynch circuits).

In the embodiment shown in FIG. 6, the 600 Hz resynchronization signal provides both frequency and timing data. Frequency data is provided in that the remote site resynch circuit 200 clock recovery circuit 214 regenerates a 9600 Hz regenerated clocking signal from the 600 Hz signal. Timing data is provided in that the control flip-flop 212 enables the output of FIFO memory buffer 202 in response to a transition of the same 600 Hz resynchronization signal. Hence, both timing and frequency information are conveyed from the control point C to the remote site S over a single 7.5 kHz program channel R different from data channel D.

Since the remote site resynchronization circuit 200 includes a PLL-based clock recovery circuit 214, it is important that the 600 Hz resynchronization signal in the embodiment shown in FIG. 6 is never interrupted or discontinuous. Even a PLL circuit optimized for minimum response time takes several hundred milliseconds to lock onto a new signal. Hence, any interruptions or discontinuities in the 600 Hz resynchronization signal could cause significant instabilities in the recovered clock signal which would, in turn, cause unpredictable and erratic readouts of the FIFO memory buffer 202 and seriously degrade simulcast operation.

It is important to the proper operation of the embodiment described above that the 600 Hz resynchronization signal is continuous and periodic. In some applications, there may be other, independent system timing or synchronization criteria that must also control data arrival timing to the remote sites. One example of such other independent timing or synchronization criteria is the requirement that all working channel transmissions must be synchronized in absolute time (and not merely with respect to the other sites) in order to assure proper handshaking with mobile transceivers. This additional timing requirement (which is independent of the simulcasting coherence requirement) in the GE PST system thus requires that the transmission on a given working channel to: (a) be coherent with the transmissions at other sites (same channel), and (b) occur within a certain time window in absolute time relative to a prior event (e.g., a previous control channel transmission). Typically it does not matter when (in absolute time) a simulcasted signal is actually transmitted so long as all transmitters transmit the signal simultaneously—but this additional timing requirement in the GE PST system is an exception to "typical" simulcasting requirements. The additional absolute time requirement in the GE PST system (similar additional absolute timing requirements may exist in other systems) is satisfied by a further presently preferred exemplary embodiment of the present invention.

Referring once again to FIG. 4, direct (asynchronous) preset or clear inputs of some of the stages of divide-by-16 counter 114 used to produce the 600 Hz resynchronization signal are connected to a resynch reset input. By controlling the level present on the resynch reset input signal, at least one of the stages providing the 600 Hz resynchronization signal can be selectively inhibited ("turned off")—thus preventing the resynchronization signal from being produced. Upon releasing the resynch reset signal, the resynchronization signal divider stages begin counting again (and moreover, always begin counting from a predefined logic state determined by which counter stage direct inputs—that is, "set" or "reset"—the resynch reset signal is connected to). By controlling the time at which the resynch reset signal is released with respect to another system event (e.g., a transmission over the control channel), it is possible to time the read-out from the remote site FIFO memory buffers 202 so that all FIFO buffers are read out at the same, absolute time with respect to the system event.

As discussed above, interrupting the 600 Hz resynchronization signal can and will seriously degrade the operation of the remote site PLL-based clock recovery circuit 214. To overcome this problem, in this second embodiment of the invention a frequency reference tone different from the 600 Hz resynchronization signal is employed to provide frequency information to the remote site resynchronization circuits. Referring once again to FIG. 4, the master clock signal appearing on clock line 106 is first divided by a factor of 2 (by a flip-flop stage not controlled by the resynch reset signal) to provide a 4800 Hz reference tone in step with the 9600 Hz master clock signal. This continuous, uninterrupted 4800 Hz reference tone is then distributed to all of remote sites S via additional 7.5 kHz program channels R as a continuous clock recovery frequency reference for PLL-based clock recovery circuits 214. Thus, in this second preferred embodiment, the frequency reference input to recovery circuits 214 is tied to the 4800 Hz frequency reference tone instead of to the 600 Hz resynchronization timing signal (see FIG. 5). The 4800 Hz frequency reference tone is further divided down by the remainder of the stages of the divide by 16 counter 114 within the control point resynchronization circuit 100 (see FIG. 4) to provide the 600 Hz resynchronization timing signal—which now is encoded with two independent pieces of timing information (that is—when the control point FIFO memory buffer 202 is controlled to output the beginning of a 9600 baud serial data signal, and when the resynch reset signal changes levels to allow that output control to occur).

Only a slight modification to the circuit shown in FIG. 6 is needed to provide separate frequency and timing signals. Specifically, the counter 306 modulus must be changed from 16 to 2 which changes the multiplication factor of PLL 304 from 16 to 2. The line from the output of gate 320 to the reference input of the PLL 304 is eliminated, and the PLL reference input is instead fed from the incoming 4800 Hz frequency reference tone for remote operation. Similarly, the output of the first flip-flop stage of counter 306 is provided in the control point resynchronization circuit as the additional 4800 Hz frequency reference tone output.

In the preferred embodiment, the 600 Hz resynchronization signal is transmitted from the control point C to the remote sites S through a T-1 digital multiplex 7.5 kHz program channel (one for each site) to result in less than 1 micro second of jitter on the received signal relative to the signal as transmitted. The 4800 Hz frequency reference tone is transmitted to the sites over a second 7.5 kH program channel (an additional channel for each site). By separating the 9.6 kHz clock recovery function from this reference tone, independent access to the resynchronization signal for an additional control function is provided. Thus, a continuous 9600 Hz data clock signal can be regenerated from the 4800 Hz frequency reference tone while the 600 Hz time resynchronization signal can be interrupted as required by other system criteria.

While the preferred embodiments uses group (phase linear) and absolute delay equalized program and synchronous data grade channels provided by a conventional type T-1 TDM 1.544 MBit multiplexed telephone switching system to convey the additional timing/frequency signals and the multi-level multi-phase data, respectively, from the control point to the remote sites, other types of channels could be used instead. For example, a sync tone of say 1200 Hz (a sub-multiple of the 9600 Hz master clock frequency for convenience) could be provided over FDM voice or data grade multiplex channels phase locked to one of the multiplex pilot tones (to prevent frequency offsets) so long as the phase drift resulting from the pilot locking circuitry could be kept below 4.3 degrees—which amounts to 10 microseconds at 1200 Hz. Alternatively, it is possible to distribute the resynchronization signal using FSK data modems (e.g., Motorola type MC145450 or the like)—the effect of which is to wash out phase jitter and offset the problems of FDM multiplex pilot locking discussed above. Bell 202 and CCITT v.23 data modem protocols are FSK and will easily support 1200 Hz signals over standard voice grade telephone channels. Utilizing an FSK modem, it is possible to distribute the resynchronization and reference tones over a multiplex channel (for example) that is not absolutely phase stable. Converting the resynchronization and/or reference tone signals to sine waves, transmitting them over T-carrier voice grade channels, and reconverting them to square waves by limiters has, however, been found to be unacceptable for the particular application of the preferred embodiment (the GE 9600 baud PST system) because this technique yields excessive phase jitter (15-20 microseconds).

Another problem may arise because of power glitches or the like destroying synchronization during continuous data transmission. In the GE PST system data is transmitted continuously over the control channel—and thus, the control point and remote site resynchronization circuits 100, 200 may be required to continuously resynchronize a data stream with no interruption. If a power glitch causes the data to become out of step with the resynchronization signal (a very real possibility in an electrical storm), the resynchronization circuits may be unable to recover. One solution to this problem is to periodically briefly interrupt the continuous data stream (e.g., under software control) to allow continual re-synchronizing by restarting the data stream.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a radio frequency simulcasting system of the type including a control point connected by data links to plural spatially separated radio frequency transmitters, a clocking signal being available at said control point, a method of providing substantially simultaneous high speed digital data transmissions from said plural transmitters, said method including the steps of:

distributing said high speed digital data from said control point to said plural transmitters over said data links at timings responsive to said clocking signal available at said control point, said distributing of said high speed data including the steps of receiving and storing said high speed data in a buffer at each of said plural transmitters;

distributing further timing/frequency signal to said plurality transmitters over further signal paths distinct from said data links;

generating a further clocking signal at each of said transmitters in response to said distributed timing/frequency signals;

synchronizing, at each of said plural transmitters, the reading of said stored high speed digital data out of said buffer at times and at a rate responsive to said timing/frequency signals and said further clocking signal; and transmitting said read out synchronized data over RF channels.

2. A method as in claim 1 wherein said generated step includes the step of regenerating said clocking signal available at said control site from said timing/frequency signal.

3. In a radio frequency simulcasting system of the type including a control point connected by data links to plural radio frequency transmitter sites, said data links exhibiting time delay ambiguities, a method of transmitting high speed digital data coherently from said plural transmitter sites, said method comprising the steps of:

(a) transmitting digital data from said control point to said plural radio frequency transmitter sites over said data links;

(b) transmitting a synchronization signal from said control point to at least one of said plural radio frequency transmitter sites over a further signal path different from said data links, said further signal path exhibiting substantially no time delay ambiguity;

(c) receiving said synchronization signal at said at least one radio frequency transmitter site and synchronizing said transmitted digital data at said at least one radio frequency transmitter site in response to said received synchronization signal, said receiving step further including the steps of receiving said high speed digital data transmitted by said step (a) and storing said received high speed digital data into a buffer and reading said stored digital data out of said buffer at times and at a rate responsive to said synchronization signal; and (d) substantially simultaneously transmitting said digital data from each of said plural radio frequency transmitter sites, including the step of transmitting said synchronized data from said at least one radio frequency transmitter site.

4. A method as in claim 3 further including the preliminary step of initially synchronizing said digital data with said synchronization signal at said control point prior to said transmitting step (a).

5. A method as in claim 3 wherein said transmitting step (b) includes the steps of:

(i) generating a synchronization signal encoded with time and frequency information; and (ii) transmitting said synchronization signal over plural respective channels to corresponding plural RF transmitter sites.

6. A method as in claim 3 wherein said transmitting step (b) includes the steps of:
   (i) generating, at said control point, a reference tone encoded with frequency information;
   (ii) generating, said control point, a synchronization signal in response to said reference tone, said synchronization signal being encoded with timing information;
   (iii) transmitting said reference tone over a first set of plural respective channels to corresponding plural RF transmitter sites; and
   (iv) transmitting said synchronization signal over a second set of plural respective channels, different from said first set of channels, to said corresponding plural RF transmitter sites.

7. A method as in claim 3 further including encoding said synchronization signal with timing information unrelated to timing information required to perform said simultaneous transmitting step (d).

8. A radio frequency simulcasting system including:
   a control point including synchronization signal generating means for generating a synchronization signal and means for providing digital data;
   a first RF transmitter;
   a second RF transmitter;
   a first data link for transmitting said digital data from said control point to said first RF transmitter, said first data link means exhibiting a first variable time delay;
   a second data link for transmitting said digital data from said control point to said second RF transmitter, said second data link exhibiting a variable time delay different than said first variable time delay;
   synchronization signal link means connected to said control point synchronization signal generating means for communicating a signal responsive to said generated synchronization signal from said control point to said first and second RF transmitters;
   said synchronization signal link means including delay equalizing means for equalizing the transmission delay of said signal responsive to said generated synchronization signal which is carried by said synchronization signal link means to said first transmitter with respect to the transmission delay of the same said signal carried to said second transmitter by said synchronization signal link means;
   first synchronizing means at said first RF transmitter and connected to said first data link means for synchronizing said transmitted digital data in response to said signal received over said synchronization link means and for applying a synchronized version of said data to said first transmitter; and
   second synchronizing means at said second transmitter and connected to said second data link means for synchronizing said transmitted digital data in response to said signal received over said synchronization link means and for applying a synchronized version of said data to said second transmitter, wherein said first synchronizing means includes:
   buffer means for temporarily storing digital data;
   means connected to said buffer means and to said first data link means for writing said digital data transmitted over said first data link means into said buffer means; and
   means connected to said buffer means and to said first data link means for writing said digital data transmitted over said first data link means into said buffer means; and
   means connected to said buffer means and to said synchronization signal link means for reading said digital data out of said buffer means at times responsive to said synchronization signal transmitted over said synchronization signal link means, said synchronization signal having a period exceeding the maximum expected difference in said first and second variable time delays.

9. A system as in claim 8 wherein said control point further includes further synchronizating means for synchonizing said digital data in response to said synchronization signal and for applying said synchronized data to said first and second data link means.

10. A synchronizing circuit for RF simulcast operation, said circuit comprising:
   first-in-first-out buffer means for storing a digital data stream applied to an input thereof in response to a first clocking signal associated with said data stream, said first-in-first-out buffer means providing an output signal indicating data has been successfully stored therein;
   data activity detecting means connected to said buffer means input for providing a first control signal in response to the occurrence of data on said buffer means input; and
   synchronizing control means connected to receive said buffer means output indicating signal and said first control signal and also connected to receive a synchronizing signal for gating said synchronizing signal responsive to said buffer means output enable signal and said first control signal to provide an output enable signal;
   said buffer means also for outputting said stored digital data stream in response to a further clocking signal and said output enable signal.

11. A sunchronizing circuit as in claim 10 further including clock recovery means connected to receive said synchronization signal for providing said further clocking signal to said buffer means in response to said synchronization signal.

12. A synchronizing circuit as in claim 10 further including means for deriving said further clocking signal from said first clocking signal.

13. A synchronizing circuit as in claim 10 further comprising phase locked loop means for deriving said further clocking signal from an externally generated frequency reference tone different from said synchronizing signal.

14. A synchronizing circuit as in claim 1 further including:
   first and second output terminals each operatively coupled to said buffer means;
   first divider means connected to said first clocking signal for generating a frequency reference tone responsive to said first clocking signal and for providing said frequency reference tone at said circuit first output terminal; and
   second divider means connected to receive said frequency reference tone and also connected to receive an externally generated reset signal for generating said further clocking signal in response to said frequency reference tone and said reset signal and for applying said further clocking signal to said circuit second output terminal.

15. A synchronizing circuit as in claim 14 wherein said second divider means includes means for setting to a predetermined state in response to said reset signal.

16. A synchronizing circuit as in claim 10 wherein said circuit is connected to receive an externally generated synchronizing signal and an externally generated frequency reference tone and further comprises:

clock recovery/multiplying means connected to receive said frequency reference tone for deriving a said further clocking signal from said frequency reference tone; and means for providing said synchronization signal to said synchronizing control means.

17. In a simulcasting type RF communications system of the type including a central site providing a stream of high speed data signals and plural RF transmitter sites capable of transmitting data signals coherently over a common radio frequency channel, an improved method for providing data signal coherency including the following steps:

(a) receiving and storing, at each of said plural transmitter sites said stream of high speed data signals, said data signals received at each said transmitter site having time ambiguities with respect to said data signals received at another said transmitter site;

(b) also receiving, at each of said plural transmitter sites, a timing signal from said central site, which is not subject to said timing ambiguities;

(c) synchronizing the read out of said received and stored high speed data signal streams with said timing signals at said plural transmitter sites; and (d) simulcasting said synchronized high speed data signal streams from said plural RF transmitter sites.

* * * * *